United States Patent [19]

Moore

[11] 4,053,544
[45] Oct. 11, 1977

[54] FUEL INDUCTION SYSTEM FOR INTERNAL COMBUSTION ENGINES

[75] Inventor: Jesse C. Moore, Celina, Ohio

[73] Assignee: J. C. Moore Research, Inc., Celina, Ohio

[21] Appl. No.: 460,915

[22] Filed: Apr. 15, 1974

[51] Int. Cl.² .......................................... F02M 31/14
[52] U.S. Cl. .............................. 261/145; 123/122 D;
261/50 A; 261/65; 261/69 A; 261/78 R;
261/DIG. 18; 261/DIG. 38; 261/DIG. 39;
261/DIG. 74
[58] Field of Search .......... 261/50 A, 69 A, DIG. 74,
261/DIG. 18, DIG. 49, 78 R, 65, 145, DIG. 23,
DIG. 38, DIG. 68, DIG. 39, 43, 64 R; 123/122
E, 131, 122 D; 251/61.4, 75

[56] References Cited
U.S. PATENT DOCUMENTS

| 2,102,476 | 12/1937 | Mennesson | 123/122 D X |
|---|---|---|---|
| 2,318,216 | 5/1943 | Garretson | 261/50 A X |
| 2,349,775 | 5/1944 | Udale | 261/69 A X |
| 2,591,356 | 4/1952 | Howe, Jr. | 261/69 A X |
| 2,600,368 | 6/1952 | Winkler | 261/DIG. 74 X |
| 2,712,427 | 7/1955 | Welborn et al. | 251/75 X |
| 2,783,983 | 3/1957 | Benvenuti | 261/78 R X |
| 2,857,146 | 10/1958 | Carlson | 261/43 X |
| 2,986,378 | 5/1961 | Moseley | 261/19 |
| 3,054,603 | 9/1962 | Rodgers | 261/50 A X |
| 3,061,286 | 10/1962 | Mennesson | 261/36 A X |
| 3,236,257 | 2/1966 | Marsh | 251/75 X |
| 3,752,451 | 8/1973 | Kendig | 261/50 A X |
| 3,778,038 | 12/1973 | Eversole et al. | 261/36 A X |

FOREIGN PATENT DOCUMENTS

| 1,010,806 | 6/1952 | France | 261/78 R |
|---|---|---|---|
| 1,352,216 | 1/1964 | France | 261/50 A |

Primary Examiner—Frank W. Lutter
Assistant Examiner—William A. Cuchlinski, Jr.
Attorney, Agent, or Firm—Jacox & Meckstroth

[57] ABSTRACT

A system for supplying fuel to an internal combustion engine for optimum efficiency in engine operation and fuel economy and for minimum objectionable exhaust emissions. The system pertains particularly to an internal combustion engine in an automobile, truck, or the like. Fuel is heated prior to introduction thereof into the engine. Fuel is introduced to the engine in accordance with manifold pressures.

19 Claims, 11 Drawing Figures

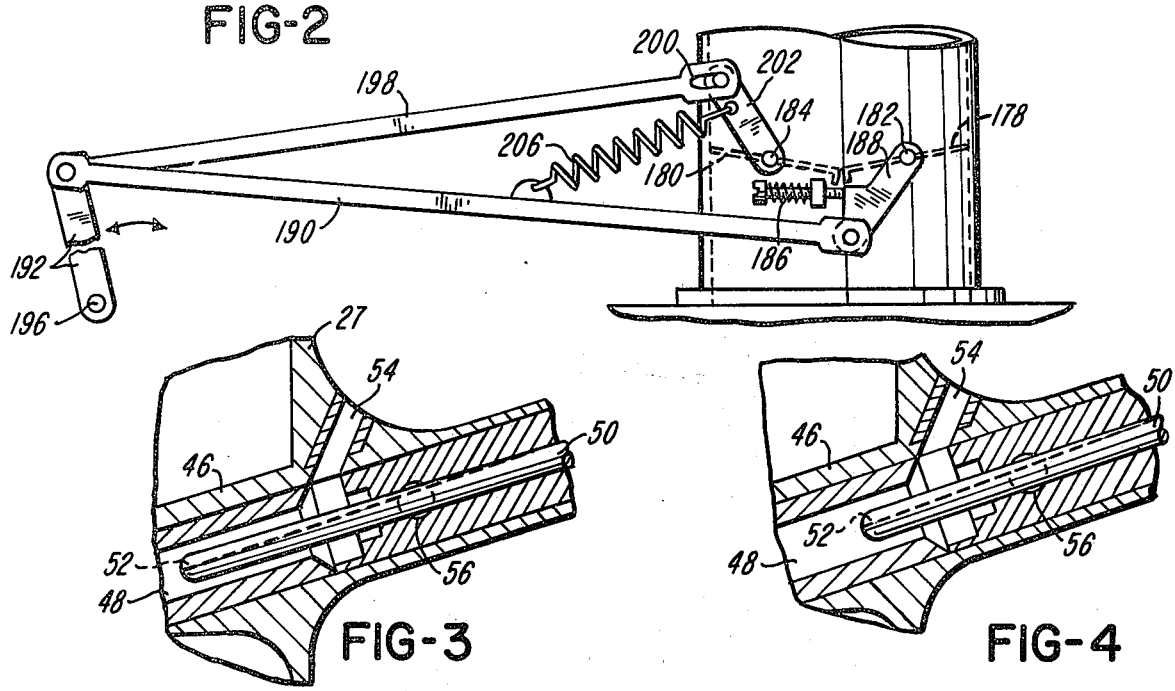
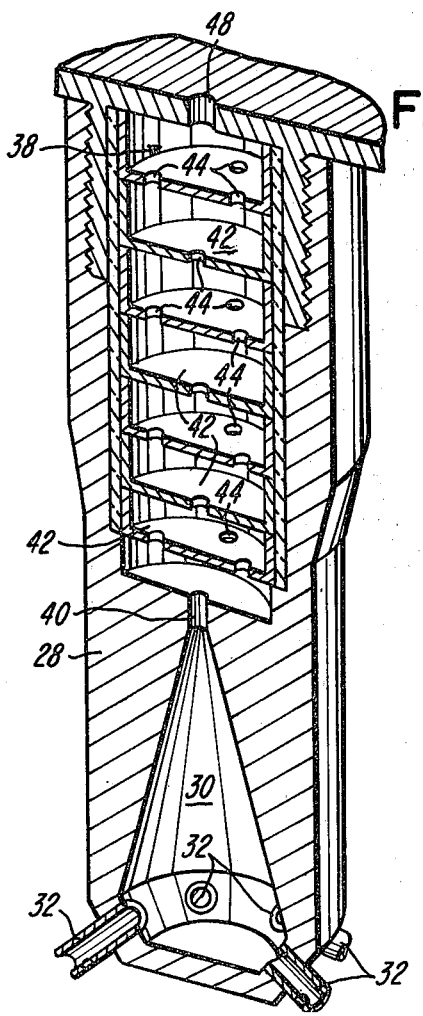
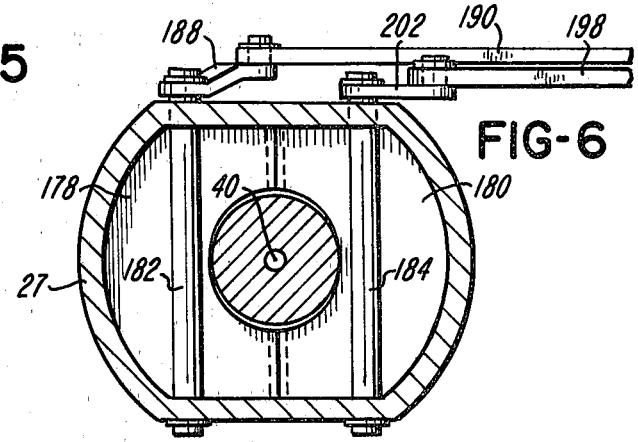
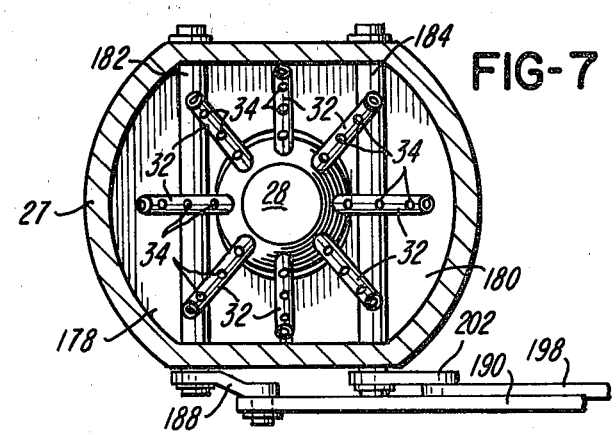

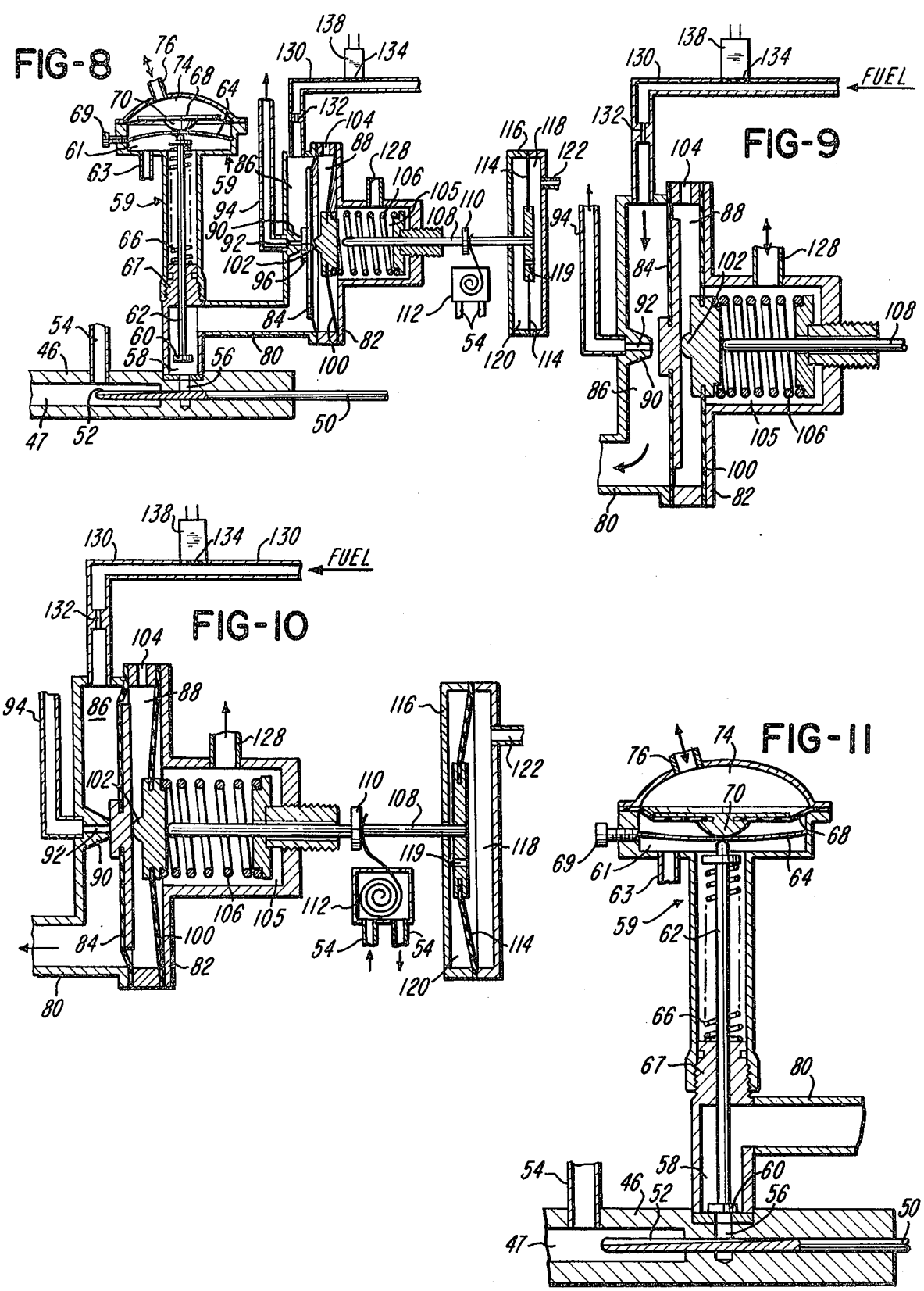

FUEL INDUCTION SYSTEM FOR INTERNAL COMBUSTION ENGINES

BACKGROUND OF THE INVENTION

It is an object of this invention to provide a system for supplying fuel to an internal combustion engine in proper air-fuel ratio over a wide range of engine speeds, loads, temperatures, humidity, and other conditions.

It is another object of this invention to provide such a system by which high efficiency of engine operation may be obtained.

It is another object of this invention to provide such a system by which objectionable exhaust conditions are maintained at a minimum.

It is another object of this invention to provide means by which flow of fuel to the engine automatically ceases when the vehicle is coasting or decelerating and in which flow of fuel to the engine automatically resumes when coasting ceases.

It is another object of this invention to provide means by which fuel is introduced into an engine without the undesirable characteristics of a carburetor.

Other objects and advantages of this invention reside in the construction of parts, the combination thereof, the method of manufacture, and the mode of operation, as will become more apparent from the following description.

BRIEF DESCRIPTION OF THE DRAWINGS

FIG. 2 is a diagrammatic type of side elevational view, drawn on a larger scale than FIG. 1, showing a portion of the system which is controlled by the foot throttle of an internal combustion engine of which a system of this invention is a part.

FIG. 3 is an enlarged fragmentary sectional view of a portion of the system illustrated in FIG. 1.

FIG. 4 is a sectional view illustrating the portion of the system shown in FIG. 3, but in another position of operation.

FIg. 5 is an enlarged perspective sectional view of a portion of the system shown in FIG. 1.

FIG. 6 is an enlarged sectional view taken substantially on line 6—6 of FIG. 1.

FIG. 7 is an enlarged sectional view taken substantially on line 7—7 of FIG. 1.

FIG. 8 is an enlarged fragmentary diagrammatic sectional view of a portion of the fuel induction system of this invention.

FIG. 9 is an enlarged fragmentary diagrammatic type sectional view, drawn on a larger scale than FIG. 8 of a portion of the system shown in FIG. 8, but in another position of operation.

FIG. 10 is an enlarged fragmentary diagrammatic type of sectional view, drawn on substantially the same scale as FIG. 9, of a portion of the system shown in FIG. 8, but in another position of operation.

FIG. 11 is an enlarged fragmentary diagrammatic type of sectional view of a portion of the system shown in FIG. 8, drawn on a larger scale than FIG. 8 and showing another position of operation of a portion of the system shown therein.

DETAILED DESCRIPTION OF THE INVENTION

Figure 1:
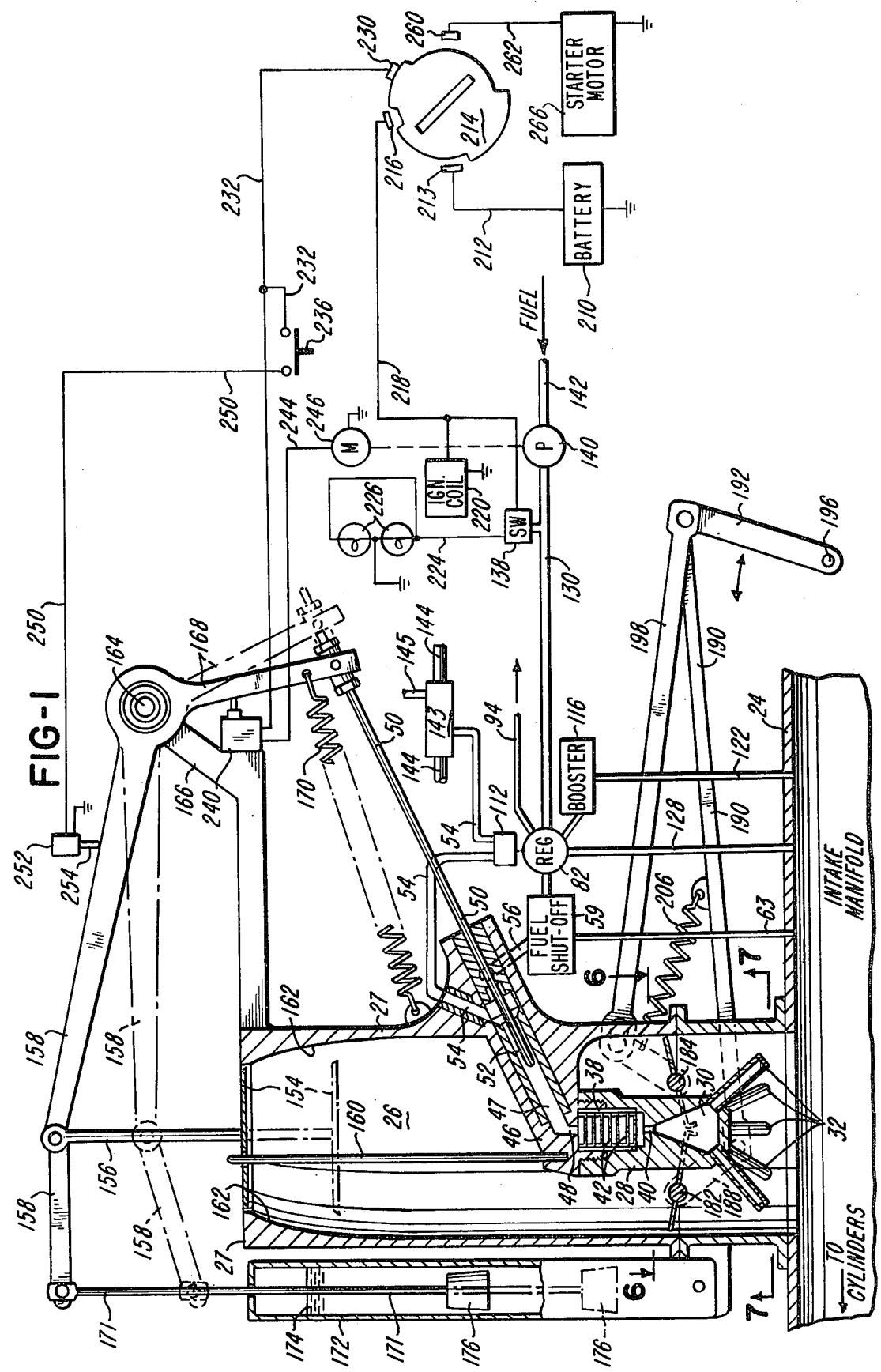
FIG. 1 is a schematic view of the fuel induction system of this invention, showing parts broken away and in section.

The fuel induction system of this invention is adapted to be associated with or in combination with an internal combustion engine, not shown. An intake manifold 24 leads to the cylinders of the internal combustion engine, as illustrated in FIG. 1. Leading to the intake manifold 24 is a mixing chamber or vacuum chamber 26, best shown in FIG. 1, within an air intake housing 27. At the lower portion of the mixing chamber 26 is a vaporizer body 28, shown in FIGS. 1, 5 and 7. Within the vaporizer body 28 is a generally conical vaporizer cavity 30, from which extend a plurality of fuel spreader tubes or nozzles 32, each of which has a plurality of apertures 34, shown in FIG. 7.

Within the vaporizer body 28 and positioned above the vaporizer cavity 30 is a vaporizer chamber 38, which is separated from the vaporizer cavity 30 by a passage 40. Within the vaporizer chamber 38 are a plurality of substantially parallel spaced-apart horizontally disposed vaporizer discs 42, which are arranged one above the other and which extend across the vaporizer chamber 38. Each of the vaporizer discs 42 is provided with one or more apertures 44. An aperture 44 in one vaporizer disc 42 is out of alignment with any aperture in the disc 42 which is immediately above or below.

Joined to the vaporizer body 28 at the upper portion thereof is a fuel conduit 46 having a fuel passage 47 which is connected to the vaporizer chamber 38 by an orifice 48. Within the fuel passage 47 is a metering rod 50 which has an elongate longitudinally extending metering groove 52 at the surface thereof. The metering groove 52 has its greatest depth at the end of the metering rod 50, and the groove 52 gradually decreases in depth in a direction away from the end thereof and has its minimum depth at a position spaced from the end of the metering rod 50.

Leading to the fuel passage 47 is an air conduit 54. Leading to the metering rod 50 is a fuel passage 56, which is in communication with a valve chamber 58, shown in FIGS. 8 and 11. The valve chamber 58 is part of a fuel shutoff valve housing 59. Within the valve chamber 58 is a valve 60, carried by a stem 62. The stem 62 extends through a seal member 67 and the end thereof which is opposite the valve 60 is in engagement with a snap leaf spring 64, which is within a region 61 at the upper part of the housing 59. A conduit 63 is joined to the intake manifold 24, as illustrated in FIG. 1, and is also joined to the housing 59 in communication with the region 61, as shown in FIGS. 8 and 11. The snap leaf spring 64 is a relatively narrow strip which extends across the upper part of the housing 59. The snap leaf spring 64 engages an adjustment screw 69.

A coil spring 66 encompasses the stem 62 and urges the stem 62 toward the snap leaf spring 64. Positioned adjacent the snap leaf spring 64, on the side thereof opposite the stem 62, is a diaphragm 68, which has a protuberance 70 in engagement with the snap leaf spring 64. The diaphragm 68 separates the region 61 from a region 74 within the upper part of the housing 59. The region 74 is in communication with the atmosphere through a passage 76.

The valve chamber 58 of the valve housing 59 is in communication with a conduit 80 which leads to a regulator housing 82. Within the regulator housing 82 is a diaphragm 84 which separates the regulator housing 82 into a region 86 and a region 88. Within the region 86 the housing 82 has a protuberance 90 which is provided with an orifice 92 extending therethrough, which communicates with a fuel return conduit 94. The diaphragm 84 has an engagement portion 96 which is movable into engagement with the protuberance 90 to close the orifice 92. The region 88 is formed by the diaphragm 84 and a diaphragm 100. The diaphragm 100 has an engagement protuberance 102 which is engageable with the diaphragm 84. A port 104 in the housing 82 provides communication between the region 88 and the atmosphere.

The housing 82 has a chamber 105 which contains a coil spring 106 which engages the diaphragm 100 and urges the diaphragm 100 toward the diaphragm 84. An actuator rod 108 is slidably movable within the chamber 105 of the housing 82 and is encompassed by the coil spring 106, which is within the chamber 105. The actuator rod 108 has an end portion within the chamber 105 which is engageable with the diaphragm 100 for movement thereof toward the diaphragm 84.

A collar 110 is secured to the actuator rod 108 exterior of the housing 82 and is engaged by a thermally responsive actuator device 112. The actuator rod 108 is connected to a diaphragm 114 which is mounted within a booster housing 116. The diaphragm 114 has an orifice 119 therethrough. The diaphragm 114 divides the housing 116 into a section 118 and a section 120. The section 118 is in communication with the intake manifold 24 through a conduit 122, shown in FIG. 1.

Joined to the regulator housing 82 and in communication with the chamber 105 thereof is a conduit 128 which is connected to the intake manifold 24, as shown in FIG. 1.

Joined to the regulator housing 82 and in communication with the region 86 is a conduit 130 which has an orifice 132 therein adjacent the housing 82. In the wall of the conduit 130 and spaced from the orifice 132 is a diaphragm 134 which is in combination with a fluid pressure switch 138. The conduit 130 is connected to a fuel pump 140, shown in FIG. 1 which by means of a conduit 142, is connected to a source of fuel, not shown.

The air conduit 54 extends from the fuel passage 47 to a heat exchanger 143, shown in FIG. 1. The heat exchanger 143 receives heat from an exhaust pipe 144, which extends therethrough. A conduit 145 communicates with the atmosphere and also leads to the heat exchanger 143 and is also in communication with the conduit 54, so that air from the atmosphere enters the heat exchanger 143 and flows to the fuel passage 47 through the conduit 54. The conduit 54, between the heat exchanger 143 and the fuel passage 47, is in communication with the thermally responsive actuator 112, as shown in FIGS. 1, 8 and 10.

The vaporizer body 28, as shown in FIG. 1, is positioned within the vacuum chamber 26 which is the communication with the intake manifold 24. The vacuum chamber 26 is within the air intake housing 27. Within the upper portion of the vacuum chamber 26 is an air control gate 154, which is attached to a rod 156, which is pivotally attached to an arm 158. A stem 160 is secured to the vaporizer body 28 extends upwardly therefrom, and slidably extends through the air control gate 154, to assure straight line movement of the air control gate 154. The vacuum chamber 26 has internal walls 162 which are curved in accordance with calibrated opening areas created by movement of the air gate 154, to control in a predetermined manner the volume of air flow permitted into the vacuum chamber 26 in accordance with the position of the control gate 154 within the vacuum chamber 26.

The arm 158 is pivotally attached by a shaft 164 to a fixed bracket 166. Joined to the arm 158 and pivotally movable therewith is an arm 168. The metering rod 50 is connected to the arm 168 for movement therewith. A spring 170 is attached to the arm 168 and to the air intake housing 27 and urges the arm 168 toward the air intake housing 27.

The arm 158 has a rod 171 pivotally attached thereto and extending downwardly therefrom, as illustrated in FIG. 1. The rod 171 extends into a container 172 which contains a fluid such as a light oil 174 or the like. The rod 171 has a piston 176 attached thereto, at the lower end thereof.

Within the air intake housing 27 at the lower portion thereof are throttle valves 178 and 180, each of which partially encompasses the vaporizer body 28, as best shown in FIGS. 6 and 7. The throttle valve 180 is attached to a shaft 184 for pivotal movement therewith. An adjustment screw 186, shown in FIG. 2, is engageable by the link 188 to limit the pivotal position of the throttle valve 178. The shaft 182 has a link 188 attached thereto for pivotal movement thereof. The link 188 is pivotally joined to a link 190 which is pivotally attached to a foot throttle lever 192. The lever 192 is attached to a foot throttle pedal, or other control element, not shown and is pivotal about a fixed shaft 196.

Also pivotally attached to the lever 192 is a link 198 which, through an elongate slot 200, is pivotally joined to a link 202, which is attached to the shaft 184 for pivotal movement thereof. A tension spring 206 joins the link 202 to the link 190.

A battery 210, shown in FIG. 1, is connected by an electric conductor 212 to a terminal 213. A rotatable electrical switch plate 214 is engageable with the terminal 213. A terminal 216 is also engageable by the switch plate 214 and through a conductor 218 is connected to an ignition coil 220 and to the fluid pressure switch 138, which is adjacent the conduit 130 and which is discussed above. A conductor 224 connects the switch 138 to a set of indicator lamps 226.

A terminal 230 is also engageable by the rotatable switch plate 214 and by means of a conductor 232 is connected to a manually operable normally-open switch 236. The conductor 232 is also connected to a switch 240 which is positioned adjacent the arm 168 for operation thereby. By means of a conductor 244 the switch 240 is connected to a motor 246 which operates the fuel pump 140. The switch 236 is connected by a conductor 250 to an actuator 252, which may be any suitable electrically operable actuator, such as a solenoid type of actuator or the like. The actuator 252 has an actuator rod 254 which is movable into engagement with the arm 158 for movement thereof.

The rotatable switch plate 214 is also engageable with a therminal 260 which, through a conductor 262, is connected to an engine crank motor or starter motor 266.

OPERATION

As illustrated in FIG. 1, the intake manifold 24 is in communication with the cylinder of an internal combustion engine, not shown. To start the engine the electrical switch plate 214 is rotatively moved to a position in which the electrical switch plate 214 engages the terminals 213 and 216, as well as the terminal 230. Then the manually operable switch 236 is closed. This causes energization of the actuator 252, causing the rod 254 thereof to move downwardly. Downward movement of the rod 254 pivotally moves the arm 158 downwardly a small distance. Thus, through the rod 156, the air control gate 154 is moved downwardly a small distance into the upper part of the vacuum chamber 26, to provide an opening for air to flow into the chamber 26.

With downward pivotal movement of the arm 158 there is upward pivotal movement of the arm 168. The switch 240, which is operated by the arm 168, is open when the arm 168 is in its lowermost position, as shown in FIG. 1. Thus, when the arm 168 is pivotally moved a small distance upwardly, the switch 240 closes. Thus, the motor 246 is energized, and the pump 140 operates. Operation of the pump 140 forces fuel from the supply thereof, through the conduit 130 to the regulator housing 82, then into the fuel passage 47, and then into the vaporizer body 28, for priming action, as illustrated in FIG. 1. The pressure of fuel in the conduit 130, through the diaphragm 134, shown in FIGS. 8, 9, and 10, causes the fluid pressure switch 138 to close. Thus, the ignition coil 220 is energized and the lamps 226 are energized.

When the operator observes that the lamps 226 are energized, he releases the switch 236 and permits the switch 236 to open. The operator then rotatively moves the electrical switch plate 214 further in a clockwise direction until the terminal 260 is engaged by the switch plate 214, and in this position of the electric switch plate 214 the conductor 232 is deenergized and the pump motor 246 stops. With energization of the terminal 260 and the conductor 262, the crank motor 266 is energized, and the engine is cranked and the engine starts. Vacuum in the intake manifold 24 and in the vacuum chamber 26 causes the air control gate 154 to move downwardly, and the arm 168 moves upwardly, allowing the switch 240 to close. Then the switch plate 214 is rotatively moved to a position in which only the terminals 230, 216, and 213 are energized, and the pump motor 246 starts again. Thus, the crank motor 266 is deenergized, but through energization of the terminal 216, the conductor 218, and the terminal 230, the conductor 232, there is continued energization of the ignition coil 220, and the pump motor 246.

Fuel flows to the regulator housing 82 through the conduit 130. Because of the limited size of the orifice 132, shown in FIGS. 8, 9, and 10, considerable fuel pressure exists between the pump 140 and the orifice 132. Fuel flows through the orifice 132 into the region 86 within the regulator housing 82. Initially, when the engine is started, the thermally responsive actuator 112 is relatively cold and applies maximum force to the actuator rod 108 and forces the actuator rod 108 toward the diaphragm 100. Thus, the protuberance 102 forces the diaphragm 84 toward the protuberance 90. Thus, the thermally responsive actuator 112 and the coil spring 106 urges the diaphragm 100 toward the diaphragm 84 and urges the diaphragm 84 toward the protuberance 90. Thus, the orifice 92 in the protuberance 90 is closed or substantially closed, as the engine starts. Thus, maximum fuel pressure exists in the region 86 of the regulator housing 82. Thus, a maximum volume of fuel is forced through the conduit 80 through the valve chamber 58 and into the fuel passage 56.

The volume of fuel which flows from the fuel passage 56 into the fuel passage 47 depends upon the position of the metering rod 50 within the fuel conduit 46. The metering groove 52 in the metering rod 50 is very shallow at the right hand portion thereof, as viewed in FIGS. 1, 3, 4 and 8. Thus, when the metering rod 50 is positioned at its extreme position within the fuel passage 47, fuel flow from the fuel passage 56 into the fuel passage 47 is substantially prevented, and when the metering rod 50 is in its extreme position withdrawn from the fuel passage 47, the opening in the metering groove for fuel flow from the fuel passage 56 to the fuel passage 47 is a maximum.

Air flows into the fuel passage 47 through the conduit 54 which leads from the heat exchanger 143. Thus, when the temperature of the exhaust in the exhaust pipe 14 is high, the temperature of the air flow into the fuel passage 47 is high.

The fuel flows from the fuel passage 47, through the orifice 48 into the vaporizer chamber 38. Within the vaporizer chamber 38 the heated fuel flows downwardly within the vaporizer chamber 38 through the apertures 44 in the vaporizes discs 42. During this flow of fuel through the discs 42, the fuel is further heated by the hot air received through the conduit 54. The fuel and hot air are drawn downwardly through the chamber 38 by vacuum which has been created in the intake manifold 24 by operation of the engine, As the fuel and hot air move downwardly within the vaporizer chamber 38, vacuum acting upon the fuel and air becomes increasingly greater, and the rate of travel of the fuel and hot air becomes increasingly greater. Thus, as the fuel passes through the orifice 40, at the lower end of the vaporizer cavity 38, the fuel instantaneously expands and is vaporized within the conical vaporizer cavity 30.

The fuel passes from the conical cavity 30, through the nozzles 32, and outwardly therefrom through the apertures 34 therein. The fuel is widely spread as it flows from the apertures 34 in the spaced-apart nozzles 32, and the fuel flows into the lower portion of the vacuum chamber 26. The fuel is mixed with air in the vacuum chamber 26 and the fuel and air mixture is rapidly drawn by vacuum into the intake manifold 24 and flows into the engine.

The volume of air flow which exists in the vacuum chamber 26 in the region of the nozzles 32 is related to the position of the air control gate 154 within the vacuum chamber 26. When the air control gate 154 is positioned in the opening at the upper end of the vacuum chamber 26, very little air can flow into the vacuum chamber 26. Thus, a small volume of air mixes with the fuel discharged from the nozzles 32.

The position of the air control gate 154 within the vacuum chamber 26 is related to the degree of vacuum which exists within the upper portion of the vacuum chamber 26. The degree of vacuum within the vacuum chamber 26 is related to the piovtal position of the throttle valves 178 and 180. When the throttle valves 178 and 180 are substantially horizontal, as illustrated in FIGS. 1, 2, 6, and 7, a very small volume of air can flow between or around the throttle valves 178 and 180 body 28. Thus, in this position, the throttle valves 178 and 180 are considered to be closed.

The pivotal position of the throttle valves 178 and 180 is controlled by the foot throttle lever 192, which is joined to a foot pedal or other control element, not shown. To move the throttle valves 178 and 180 toward open position, the lever 192 is pivotally moved counterclockwise as shown in FIG. 1, and is pivotally moved clockwise as shown in FIG. 2. When such pivotal movement of the lever 192 occurs, the link 190 immediately moves the link 188, and the link 188 pivotally moves the valve 178 in an opening direction. Initially, pivotal movement of the lever 192 moves the link 198. However, initial movement of the link 198 does not move the link 202, because the links 198 and 202 are pivotally joined together through the elongate slot 200. Thus, the link 202 and the valve 180 do not pivotally move until the link 198 has moved a short distance. Thus, the valve 178 first pivotally moves in an opening direction, creating a relatively small air passage, before the valve 180 pivotally moves in an opening direction, to create a larger air passage. Thus, as the lever 192 is initially moved, only the valve 178 pivotally moves, and a relatively small passage for flow of air to the intake manifold 24 is provided. Then with additional movement of the lever 192 there is pivotal opening movement of the valve 180, in addition to the pivotal opening movement of the valve 178.

When the valves 178 and 180 are pivotally moved in an opening direction, there is increased communication between the intake manifold 24 and the upper portion of the vacuum chamber 26. Thus, the air control gate 154 is drawn downwardly by the vacuum within the vacuum chamber 26. The extent to which the air control gate 154 is drawn downwardly within the vacuum chamber 26 is related to the vacuum which exists within the upper portion of the chamber 26.

With downward movement of the air control gate 154, there is downward pivotal movement of the arm 158. With downward pivotal movement of the arm 158, there is upward pivotal movement of the arm 168. With upward pivotal movement of the arm 168, the metering rod 50 is moved in a direction outwardly from the fuel conduit 46. As the metering rod 50 is moved in a direction outwardly from the fuel conduit 46, the part of the metering groove 52 which is adjacent the fuel passage 56 becomes increasingly larger, thus permitting a greater volume of fuel flow from the fuel passage 56 into the fuel passage 47. Thus, a greater volume of fuel flows to the vaporizer chamber 38 and to the intake manifold 24 and to the engine. Thus, as the throttle valves 178 and 180 are opened, the vacuum in the upper part of the chamber 26 draws the air control gate 154 downwardly, and when this occurs, the metering rod 50 is moved axially to permit a greater volume of fuel to flow to the engine.

Pivotal movement of the arm 158 is dampened by the resulting movement of the piston 176 within the fluid 174 within the container 172, as illustrated in FIG. 1.

All fuel flowing to the engine must flow through the region 86 of the regulator housing 82. During operation of the engine, the volume of fuel flow into the region 86 of the regulator housing 82 is always greater than the volume of fuel required to operate the engine. For this reason, during operation of the engine, a portion of the fuel which enters the region 86 of the regulator housing 82 flows outwardly from the region 86 through the orifice 92 in the protuberance 90 and into the fuel return conduit 94. Such fuel returns to the source of fuel. The volume of fuel flow into the fuel return conduit 94 is related to the position of the diaphragm 84 with respect to the protuberance 90 and the orifice 92 thereof. The pressure of fuel within the region 86 urges the diaphragm 84 in a direction away from the protuberance 90. However, the spring 106 urges the diaphragm 100 toward the diaphragm 84, thus urging movement of the diaphragm 84 toward the protuberance 90. Furthermore, when the rod 108 is in engagement with the diaphragm 100, the rod 108 is capable of urging the diaphragm 100 toward the diaphragm 84, for movement of the diaphragm 84 toward the protuberance 90.

As discussed above, the thermally responsive actuator 112, when cold, urges the actuator rod 108 toward the diaphragm 100 and thus urges the diaphragm 84 toward the protuberance 90. Such force tends to reduce the volume of fluid flowing outwardly from the region 86 through the fuel return conduit 94. Thus, a greater fuel pressure exists within the region 86 and a greater volume of fuel flows to the engine. Thus, the fuel-air ratio to the engine is richer. However, air which is heated by the exhaust conduit 144 and which is drawn through the air conduit 54 by vacuum in the intake manifold 24, heats the thermally responsive actuator 112. When sufficient heat is applied to the thermally responsive actuator 112, negligible force is applied thereby to the actuator rod 108. In this condition the thermally responsive actuator 112 has no affect upon the volume or pressure of fuel within the region 86.

As shown and discussed, the chamber 105 of the regulator housing 82 is in communication with the conduit 128, which is in communication with the intake manifold 24. Thus, vacuum within the intake manifold 24 is sensed by the diaphragm 100. When the vacuum within the intake manifold 24 is greater, the vacuum within the chamber 105 is greater, and such vacuum urges movement of the diaphragm 100 away from the diaphragm 84. Thus, forces urging the diaphragm 84 toward the protuberance 90 are reduced, and a lesser fuel pressure exists within the region 86 of the regulator housing 82. Thus, a greater volume of fuel may flow from the region 86 through the fuel return conduit 94, and a lesser volume of fuel flows to the engine. Thus, the fuel-air ratio to the engine is leaner.

The diaphragm 114 in the booster housing 116 is joined to the actuator rod 108 for affecting the position of the actuator rod 108. The conduit 122 is in communication with the section 118 of the booster housing 116, as shown in FIGS. 8 and 10, and is also in communication with the intake manifold 24, as shown in FIG. 1. Any gradual changes in degree of vacuum within the intake manifold 24 are transmitted through the conduit 122 to the diaphragm 114 within the booster housing 116. Thus, any gradual changes in the degree of vacuum within the intake manifold are rather quickly balanced on both sides of the diaphragm 114, through the orifice 119 in the diaphragm 114 and do not result in appreciable movement of the diaphragm 114. However, if the valves 178 and 180 are quickly opened, the degree of vacuum within the intake manifold 24 quickly decreases and the diaphragm 114 quickly moves in a direction to increase the volume of the section 118 within the booster housing 116. Thus, the actuator rod 108 is quickly moved in a direction toward the diaphragm 100. Thus, the forces urging the diaphragm 84 toward the protuberance 90 are increased, and less fuel flows outwardly through the fuel return conduit 94 and greater fuel pressure is created within the region 86 and a greater volume of fuel flows to the engine.

To increase fuel efficiency and to reduce objectionable exhaust emissions, the fuel shutoff valve 60 is employed. The shutoff valve 60 is normally in the position illustrated in FIG. 8, spaced from the fuel passage 56. The region 74 in the housing 59 above the diaphragm 68 is in communication with the atmosphere, through the passage 76, and the lower surface of the diaphragm 68 is in communication with the intake manifold 24, through the conduit 63. When the valves 178 and 180 are quickly closed, the degree of vacuum within the intake manifold 24 quickly rises. Such a condition may exist when the vehicle is coasting or decreasing in the rate of movement thereof. When this occurs, there is a rapid rise in the degree of vacuum within the region 61 of the housing 59. This sudden rise in the degree of vacuum within the region 61 causes the diaphragm 68 to forcefully move downwardly within the housing 59 and the diaphragm 68 engages the snap leaf spring 64, which snaps and bends downwardly and forces the stem 62 and the valve 60 downwardly. Thus, as shown in FIG. 11, the valve 60 closes the fuel passage 56 and no fuel can flow to the engine. The adjustment screw 69 serves to adjust the resiliency of the leaf spring 64, to thus adjust the force required upon the snap spring 64 to cause bending and snap action thereof.

Thus, during coasting or during decrease in speed of a vehicle, there is no fuel flow to the engine thereof. When the deceleration or coasting is completed, the degree of vacuum in the intake manifold 24 decreases. When this decrease in the degree of vacuum occurs, the snap leaf spring 64 and the spring 66 are permitted to force the diaphragm 68 and the stem 62 upardly, thus, moving the valve 60 from the fuel passage 56, opening the fuel passage 56, and permitting fuel to flow to the engine.

The engine is stopped by rotative movement of the electrical switch plate 214 to the position thereof shown in FIG. 1, deenergizing the terminals 213 and 216 and the devices electrically joined thereto. When the engine stops, no vacuum exists within the vacuum chamber 26, and conditions within the fuel induction system return to normal deactuated and deenergized conditions. Included in such return, the spring 170 forces the arms 158 and 168 to the positions thereof shown in FIG. 1. In such position the metering rod 50 is axially positioned so that the metering groove 52 is out of communication with the fuel passage 56, and no fuel can flow from the fuel passage 56 to the fuel passage 47.

Thus, it is understood that the fuel induction system of this invention has numerous advantages, including very high fuel use efficiency, and a minimum amount of air pollution.

Although the preferred embodiment of the system of this invention has been described, it will be understood that within the purview of this invention various changes may be made in the form, details, proportion and arrangement of parts, the combination thereof and methods of operation, which generally stated consist in structure and methods capable of carrying out the objects set forth, as disclosed and defined in the appended claims.

The invention having thus been described, the following is claimed:

1. Mechanism for introducing fuel into an internal combustion engine having an intake manifold, comprising:
   a housing having a vacuum chamber in communication with the intake manifold,
   a vaporizer within the vacuum chamber, the vaporizer having a vaporizer chamber and an expansion vaporizer cavity in communication with the vaporizer chamber,
   a plurality of nozzles extending from the vaporizer cavity into the vacuum chamber,
   a plurality of parallel aligned discs within the vaporizer chamber and extending across the vacuum chamber, each of the discs having at least one aperture therethrough,
   a fuel conduit in communication with the vaporizer chamber,
   a metering rod having a portion axially movable within the fuel conduit and axially movable to close the fuel conduit, the metering rod having a groove extending along a portion of the length thereof, the groove having a gradually increasing dimension along the length thereof,
   fuel pump means joined to the fuel conduit for urging flow of fuel therethrough,
   and control means for controlling the axial position of the metering rod with respect to the fuel conduit to control the volume of fuel which flows through the fuel conduit to the vaporizer chamber.

2. The mechanism of claim 1 in which the control means includes an air gate movable within the vacuum chamber and means joining the air gate to the metering rod for operation of the metering rod with operation of the air gate, the position of the air gate within the vacuum chamber being determined by the degree of vacuum which exists within the vacuum chamber.

3. The mechanism of claim 1 which includes means for heating the fuel as the fuel flows in the fuel conduit.

4. The mechanism of claim 1 which includes fuel control means operably positioned within the fuel conduit between the fuel pump and the metering rod, the fuel control means comprising a chamber through which the fuel flows, a movable diaphragm defining a wall of the chamber so that movement of a portion of the diaphragm changes the volume of the chamber, a fuel return conduit joined to the chamber and in communication therewith, means carried by the diaphragm for closing the fuel return conduit to prevent flow of fuel from the chamber through the fuel return conduit and to control the volume of fuel flowing from the chamber to the fuel return conduit, means communicating with the intake manifold for movement of the diaphragm in accordance with the degree of vacuum within the intake manifold.

5. A mechanism for introduction of fuel into an internal combustion engine provided with a main conduit for flow of fuel and air to the engine, comprising:
   a vaporizer provided with a plurality of nozzles,
   means providing communication between the vaporizer and the main conduit,
   a pair of throttle valves, there being a first throttle valve and a second throttle valve encompassing the vaporizer and pivotally movable to an open position to permit full passage of air to the engine and pivotally movable to a closed position to permit only very limited volume of air to flow to the engine,
   operator means joined to the throttle valves, the operator means including linkage means, the linkage means being connected by a pivotal and slide joint to the first throttle valve and by a pivotal joint to the second throttle valve so that as the linkage means moves the throttle valves from closed position, the second throttle valve moves first in an opening direction through a predetermined degree, to provide a controlled small opening, prior to opening movement of the first throttle valve.

6. Mechanism for introduction of fuel into an internal combustion engine having a fuel conduit, comprising a fuel vaporizer having a vaporizer chamber in communication with the fuel conduit, a purality of spaced-apart apertured discs within the vaporizer chamber for sequential flow of fuel therethrough, the fuel vaporizer having a vaporizer cavity, there being an orifice joining the vaporizer chamber to the vaporizer cavity, the vaporizer cavity being substantially conical in shape with gradually increasing dimensions extending from the orifice.

a plurality of nozzles joined to the vaporizer and extending from the portion of the vaporizer cavity which has the greatest dimension.

7. Mechanism for control of fuel flow to an internal combustion engine provided with an intake manifold comprising:
- a housing having a vacuum chamber in communication with the intake manifold, the vacuum chamber having a throat spaced from the intake manifold,
- a gate within the throat of the vacuum chamber for controlling flow of air into the vacuum chamber,
- a vaporizer within the vacuum chamber,
- fuel conduit means for conducting fuel to the vaporizer,
- control means for controlling flow of fuel in the fuel conduit means,
- movable operator means joining the gate to said control means for simultaneous operation of the gate and the control means, and throttle valve means encompassing the vaporizer.

8. Mechanism for control of fuel flow to an internal combustion engine provided with a intake manifold comprising:
- a housing having a vacuum chamber in communication with the intake manifold, the vacuum chamber having a throat spaced from the intake manifold,
- a gate within the throat of the vacuum chamber for controlling flow of air into the vacuum chamber,
- a vaporizer within the vacuum chamber,
- fuel conduit means for conducting fuel to the vaporizer,
- control means for controlling flow of fuel in the fuel conduit means,
- movable operator means joining the gate to said control means for simultaneous operation of the gate and the control means, throttle valve means encompassing the vaporizer, the throttle valve means including a pair of pivotal disc members, each of the disc members encompassing a portion of the vaporizer, the mechanism also including linkage means for pivotal movement of the disc members.

9. Mechanism for introducing fuel into an internal combustion engine having a major conduit for directing air and fuel to the cylinders of the engine and having a fuel pump for pumping fuel from a source of fuel comprising:
- a fuel conduit joined to the fuel pump to receive fuel therefrom,
- a fuel control housing connected to the fuel conduit to receive fuel from the fuel conduit,
- a pair of spaced-apart diaphragms within the fuel control housing and separating the fuel control housing into a first chamber, a second chamber and a third chamber, the fuel conduit being in communication with the first chamber,
- a fuel return conduit for flow of fuel to the source of fuel, port means joining the fuel return conduit to the first chamber of the fuel control housing, the first diaphragm having an engagement portion movable to engage the port means to close communication between the first chamber and the fuel return conduit, there being a passage leading from the second chamber,
- conduit means joining the third chamber to the major conduit, for communicating the pressure therein to the third chamber,
- means joining the first chamber to the major conduit for flow of fuel from the fuel control housing to the major conduit.

10. The mechanism of claim 9 which includes resilient means within the third chamber and urging movement of the second diaphragm toward the first diaphragm, the second diaphragm including means engageable with a portion of the first diaphragm to move said engagement portion of the first diaphragm.

11. The mechanism of claim 10 which includes an auxiliary control housing, a diaphragm within the auxiliary control housing dividing the auxiliary control housing into a first chamber and a second chamber, the first chamber being in communication with the major conduit, actuator means joining a portion of the diaphragm of the auxiliary control housing to the second diaphragm of the fuel control housing for movement of a portion of the second diaphragm of the fuel control housing with movement of said portion of the diaphragm of the auxiliary control housing.

12. The mechanism of claim 11 which includes thermally responsive motor means operably joined to the actuator means for urging movement thereof, in response to the temperature of the motor means.

13. Mechanism for control of fuel flow to an internal combustion engine provided with an intake manifold, a housing having a vacuum chamber in communication with the intake manifold, the vacuum chamber having a throat spaced from the intake manifold, a gate within the throat of the vacuum chamber for controlling flow of air into the vacuum chamber, the combination comprising: a vaporizer within the vacuum chamber, fuel conduit means for conducting fuel to the vaporizer, fuel control means for adjustably controlling flow of fuel in the fuel conduit means to the vaporizer, an electrical control system including an electrical motor and a fuel pump operable thereby, the electrical control system having an ignition control portion, an electrical pressure switch positioned to sense fuel pressure in the fuel conduit means and electrically joined to the ignition control portion of the electrical control system for energization thereof when proper fuel pressure exists in the fuel conduit means during starting operation of the engine.

14. Mechanism for introducing fuel into a internal combustion engine having an intake manifold, comprising:
- a housing having a vacuum chamber in communication with the intake manifold,
- a vaporizer within the vacuum chamber, the vaporizer having a vaporizer cavity,
- nozzle means providing communication between the vaporizer cavity and the vacuum chamber,
- a plurality of parallel aligned discs within the vaporizer, each of the discs having at least one aperture therethrough,
- a fuel conduit in communication with the vaporizer,
- a metering rod having a portion axially adjustably movable within the fuel conduit to close and to adjustably open the fuel conduit,
- fuel pump means joined to the fuel conduit for urging flow of fuel therethrough, and control means for controlling the axial position of the metering rod with respect to the fuel conduit to control the volume of fuel which flows through the fuel conduit to the vaporizer.

15. Mechanism for introducing fuel into an internal combustion engine having a major conduit for directing air and fuel to the cylinders of the engine and having a fuel pump for pumping fuel from a source of fuel comprising:
   a fuel conduit joined to the fuel pump to receive fuel therefrom,
   a fuel control housing connected to the fuel conduit to receive fuel from the fuel conduit,
   diaphragm means within the fuel control housing and separating the fuel control housing into a plurality of chambers,
   the fuel conduit being in communication with one of the chambers,
   a fuel return conduit for flow of fuel to the source of fuel, port means joining the fuel return conduit to said one of the chambers,
   the diaphragm means having an engagement portion movable to engage the port means to close communication between the said one of the chambers and the fuel return conduit,
   conduit means joining another of said chambers to the major conduit for communication of said chamber with the major conduit for sensing the pressure in the major conduit,
   vaporizer means,
   means joining the vaporizer means to said one of the chambers and to the major conduit for flow of fuel from the fuel control housing to the major conduit.

16. Mechanism for introducing fuel into an internal combustion engine having a major conduit for directing air and fuel to the cylinders of the engine and having a fuel pump for pumping fuel from a source of fuel comprising:
   a fuel conduit joined to the fuel pump to receive fuel therefrom,
   a fuel control housing connected to the fuel conduit to receive fuel from the fuel conduit,
   wall means within the fuel control housing and separating the fuel control housing into a plurality of chambers,
   the fuel conduit being in communication with one of the chambers,
   a fuel return conduit for flow of fuel to the source of fuel, port means joining the fuel return conduit to said one of the chambers,
   the wall means having an engagement portion movable to engage the port means to close communication between the said one of the chambers and the fuel return conduit,
   conduit means joining one of said chambers to the major conduit for communication of said chamber with the major conduit for sensing the pressure in the major conduit,
   vaporizer means,
   means joining the vaporizer means to said one of the chambers and to the major conduit for flow of fuel from the fuel control housing to the major conduit.

17. Mechanism for control of fuel flow to an internal combustion engine provided with an intake manifold comprising:
   a housing having a vacuum chamber in communication with the intake manifold, the vacuum chamber having a throat spaced from the intake manifold,
   a gate within the throat of the vacuum chamber for controlling flow of air into the vacuum chamber,
   a vaporizer in communication with the throat of the vacuum chamber, a plurality of aligned discs within the vaporizer, each of the discs having an aperture therethrough,
   fuel conduit means for conducting fuel to the vaporizer,
   means for introducing limited quantities of heated air into the fuel conduit means and to the fuel in the fuel conduit means,
   control means for controlling flow of fuel in the fuel conduit means,
   movable operator means joining the gate to said control means for simultaneous operation of the gate and the control means,
   and throttle valve means within the vacuum chamber.

18. Mechanism for control of fuel flow to an internal combustion engine provided with an intake manifold comprising:
   a housing having a vacuum chamber in communication with the intake manifold, the vacuum chamber having a throat spaced from the intake manifold,
   a gate within the throat of the vacuum chamber for controlling flow of air into the vacuum chamber,
   a vaporizer in communication with the throat of the vacuum chamber, a plurality of aligned spaced-apart discs in the vaporizer, each of the discs having an aperture therethrough,
   fuel conduit means for conducting fuel to the vaporizer,
   means for introducing limited quantities of heated air into the fuel conduit means and to the fuel in the fuel conduit means,
   control means for controlling flow of fuel in the fuel conduit means,
   movable operator means joining the gate to said control means for simultaneous operation of the gate and the control means, throttle valve means including a pair of complementary cooperating pivotal closure members, and linkage means for pivotal movement of the closure members.

19. A mechanism for introduction of fuel into an internal combustion engine provided with a main conduit for flow of fuel and air to the engine, comprising:
   a vaporizer provided with a plurality of nozzles,
   fuel conduit means for conducting fuel to the vaporizer, means for introducing limited quantities of heated air into the fuel conduit means,
   means providing communication between the vaporizer and the main conduit,
   a pair of throttle valves positioned between the main conduit and the vaporizer, there being a first throttle valve and a second throttle valve, the throttle valves being pivotally movable to an open position to permit full passage of air to the engine and pivotally movable to a closed position to permit only a very limited volume of air to flow to the engine,
   operator means joined to the throttle valves, the operator means including linkage means, the linkage means being connected by a pivotal and slide joint to the first throttle valve and by a pivotal joint to the second throttle valve so that as the linkage means moves the throttle valves from closed position, the second throttle valve moves first in an opening direction through a predetermined degree, to provide a controlled small opening, prior to opening movement of the first throttle valve.

* * * * *

UNITED STATES PATENT AND TRADEMARK OFFICE
CERTIFICATE OF CORRECTION

PATENT NO. : 4,053,544
DATED : October 11, 1977
INVENTOR(S) : Jesse C. Moore

It is certified that error appears in the above-identified patent and that said Letters Patent are hereby corrected as shown below:

Column 1, line 46, change "FIg" to ---FIG---.

Column 3, line 61, after "body 28" insert ---and---.

Column 4, line 57, change "therminal" to ---terminal---.

Column 4, line 63, change "cylinder" to ---cylinders---.

Column 6, line 12, change "14" to ---144---.

Column 6, lines 57 and 58, delete "body 28".

Column 11, line 29, change "a" to ---an---.

Column 12, line 51, change "a" to ---an---.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*